Figure 1:
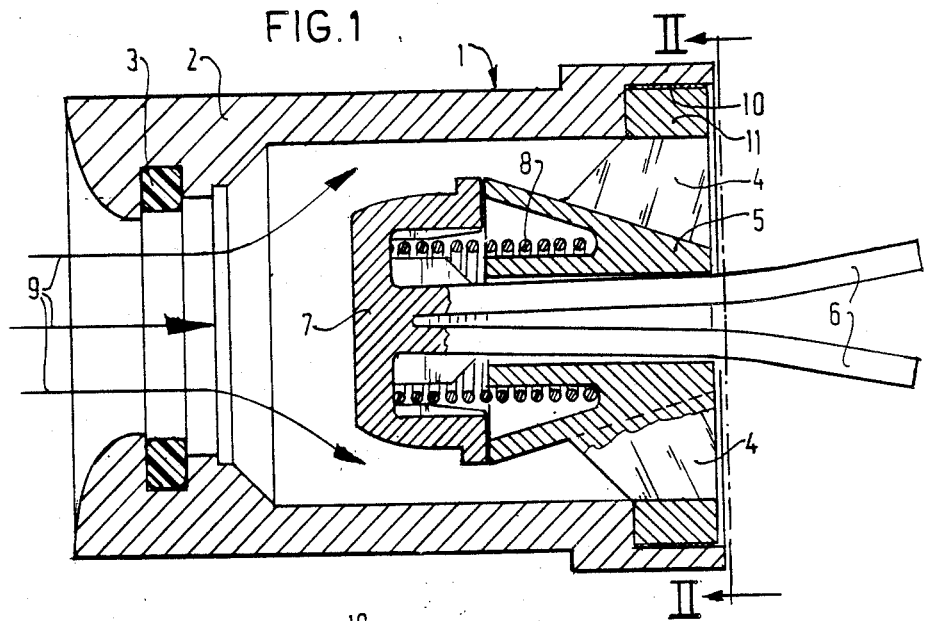

United States Patent [19]

van Rooy

[11] Patent Number: 4,930,539

[45] Date of Patent: Jun. 5, 1990

[54] ANTI-FLUTTERING CHECK VALVE

[75] Inventor: Jacob van Rooy, Rheden, Netherlands

[73] Assignee: 501 Ocean B.V., Netherlands

[21] Appl. No.: 801,384

[22] Filed: Nov. 22, 1985

Related U.S. Application Data

[63] Continuation of Ser. No. 534,768, Sep. 22, 1983, abandoned.

[51] Int. Cl.$^5$ .............................................. F16K 15/06
[52] U.S. Cl. ..................................... 137/514; 137/542; 251/64
[58] Field of Search ................... 137/514, 542; 251/64

[56] References Cited

U.S. PATENT DOCUMENTS

| | | | |
|---|---|---|---|
| 2,357,321 | 9/1944 | Fuller | 137/542 X |
| 2,564,815 | 8/1951 | Raymond | 137/514 X |
| 4,194,527 | 3/1980 | Schonwald | 137/514 X |
| 4,481,974 | 11/1984 | Schmitt | 137/514 |

FOREIGN PATENT DOCUMENTS

| | | | |
|---|---|---|---|
| 477276 | 10/1975 | U.S.S.R. | 137/514 |

*Primary Examiner*—Robert G. Nilson
*Attorney, Agent, or Firm*—John P. Snyder

[57] ABSTRACT

An anti-fluttering valve construction includes a valve member with integral stem received in an oversize cylindrical bore in a guide which can give rise to fluttering of the valve member when it is unseated. To avoid fluttering, the guide at one or both ends of the bore is segmented and a spring surrounds the free ends of the segments to deform them inwardly to define a conically inwardly tapering portion of the bore which makes highly localized contact with the valve stem.

4 Claims, 2 Drawing Sheets

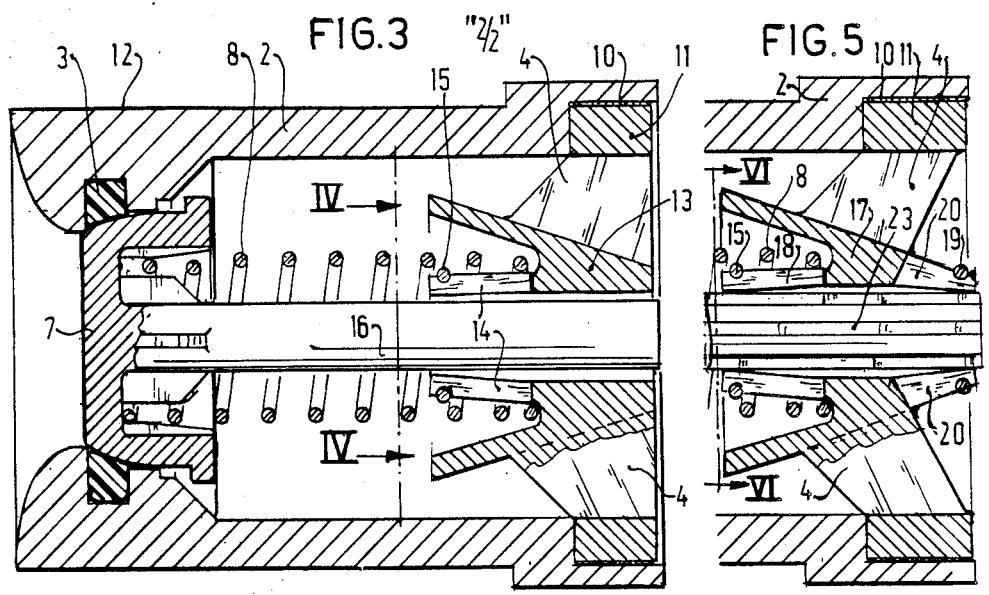
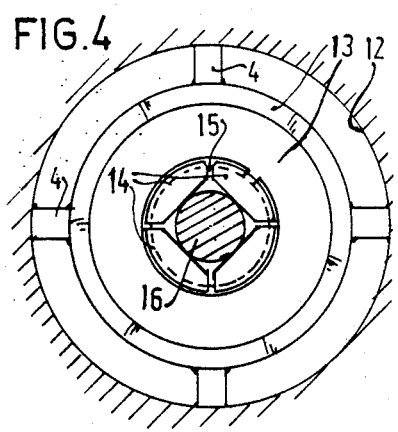
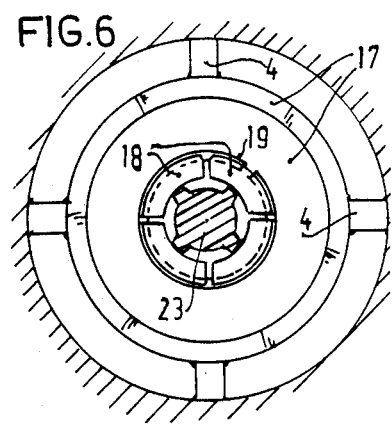
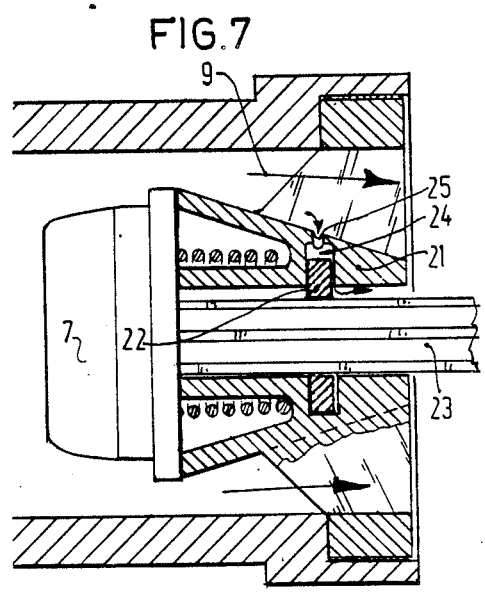

ANTI-FLUTTERING CHECK VALVE

This application is a continuation of application Ser. No. 534,768, filed Sept. 22, 1983, now abandoned.

The invention relates to a device passing a pressurized medium, for example, an adjustable flow rate limiter, a return valve or a flow rate meter comprising a housing having a medium inlet and a medium outlet, a valve seat arranged between said medium inlet and said medium outlet and a valve member corresponding to and co-operating with the latter and supported by a stem axially movable by means of a guide rigidly coupled with said housing. Such a device is known. On behalf of an easy axial displacement inside the guide of the stem the stem and the wall have a given amount of clearance. Due to this clearance often an undesirable phenomenon occurs during the passage of medium in that the valve member on the stem starts a vibratory motion, the amplitude of which is determined by the amount of clearance. When the maximum amplitude is attained, the lateral motion abruptly brakes so that a very troublesome rattling noise may be produced Dependent on the structure even resonance phenomena may occur at given flow rates.

The invention has for its object to eliminate or at least to control these undesirable vibrations to an extent such that abrupt jamming of the lateral stops can no longer occur so that rattling noise nuisance is avoided. For this purpose the device according to the invention comprises spring means maintaining the stem and the wall in clearance-free contact with one another.

For example, the stem may at least have one axial part being radially resilient in outward direction, at least a part capable of resiliently moving outwardly in a manner such that an adequate, radial component is available.

Moreover, the wall facing the stem may have at least one part which is resiliently movable inwardly. Also in this case it applies that at least an adequate radial component should be available. It may be supposed to use a structure in which the wall is divided in the longitudinal or transverse direction.

In a further potential variant the contact forces exerted by the spring means are produced at least partly by the pressure of the medium or the velocity thereof, for example, completely or partly on the basis of a venturi or a Pitot mechanism.

The invention will now be set out with reference to a few arbitrary embodiments of the invention. The drawing shows in FIG. 1 a cross-sectional view of a first embodiment of a return valve in accordance with the invention, FIG. 2 an elevational view on the plane II—II in FIG. 1, FIG. 3 a second embodiment of a return valve in accordance with the invention, FIG. 4 an elevational view taken on the plane IV—IV in FIG. 3, FIG. 5 a partial cross-sectional view of a third embodiment of the invention, FIG. 6 an elevational view taken on the plane VI—VI in FIG. 5 and FIG. 7 a fourth embodiment of a return valve in accordance with the invention.

FIG. 1 shows a return valve 1 comprising a ration-symmetrical housing 2, a resilient ring 3 serving as a valve seat, a guide 5 rigidly coupled with the housing 2 by wings 4, through which guide a stem having two parts 6 is movable, whose end facing the ring 3 has fastened to it a valve member 7, which is urged by a helical spring 8 towards the ring 3.

The arrows 9 indicate the direction of the stream of medium. By the pressure of this medium the valve member 7 moves away from the ring 3 so that the return valve 1 can be passed through. In the opposite direction the valve is closed so that the medium is prevented from flowing back. In the situation shown the return valve 1 is in the open state.

The stem parts 6 resiliently move outwardly so that they are constantly in contact with the inner wall of the guide 5.

The wings 4 are fastened to a ring 11 fastened to an inner wall of the housing 2 by a gluing surface 10.

Figure 2:
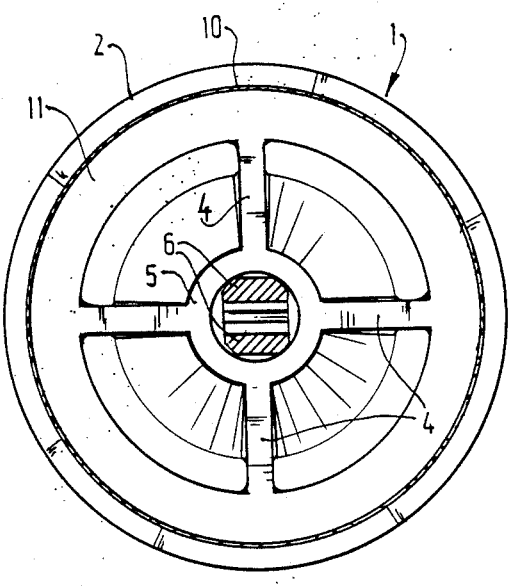

FIG. 2 shows an elevational view II—II in FIG. 1.

It should be noted that corresponding elements are designated by the same reference symbols in all Figures.

FIG. 3 shows a second embodiment. A return valve 12 has a guide 13, one part of which consists of four segments 14, which are radially urged inwardly by an annular spring 15 so that the round stem 16 is axially movable through the guide 13 without clearance.

FIG. 5 shows a third embodiment of a return valve in accordance with the invention. The guide 17 of this embodiment is provided with four wall segments 18 loaded by an annular spring at the end facing the valve member, whereas at the distal end four wall segments 20 are loaded by an annular spring 19. By this double, resilient, clearance-free guide substantially any undesirable vibration or resonance is excluded.

FIG. 7 finally shows a fourth and last embodiment of a return valve in accordance with the invention. The guide 21 has an annular guide member 22 freely movable in a plane at right angles to the axis of the stem, the movements of which are limited within an annular slot 24 which is in open communication through an aperture 25 with the passing medium. By this configuration it is ensured that by the action of the pressure of the passing medium the guide member 22 is lightly pressed against the stem 23 so that again a clearance-free spring effect is obtained. It will be obvious that the guide member may also be spring-loaded. Attention is drawn to the various shapes of stems and wall segments or walls co-operating herewith. In order to avoid deposits and hence a deteriorating guiding effect it is preferred to use a relatively high contact pressure which is obtained by relatively small contact surfaces.

The invention is not limited to the embodiments described above It will be obvious that adjustable closing members, flow-rate limiters, flow meters and the like comprising a stem-supported valve member are lying within the scope of the invention. It is furthermore noted that a device embodying the invention can be constructed so that the front face of the stem itself serves as a valve member so that the mushroom-shaped construction shown in the Figures is not employed.

I claim:

1. A flow-controlling valve construction including a hollow body adapted to pass a flowing fluid and defining an annular internal valve seat, a valve member having a head on one end thereof adapted to seat upon and close said valve seat in opposition to fluid flow through the hollow body and having an axially extending stem rigid therewith and projecting from the other end of the valve member, a support within said body and disposed in axially spaced relation to said valve seat so that when said head of the valve member is adjacent said support said head is maximally spaced from said valve seat, spring means interposed between said head and said support for normally urging said head toward seated relation with said valve seat in opposition to fluid flow through the hollow body, said support including wall means defining a bore freely, slidably receiving said stem so that when the head of the valve member is spaced both from said seat and said support, said head is supported solely by the stem in cantilever fashion from said support whereby lateral fluttering of said head and consequent chattering of the stem within the bore is possible due to fluid flow through the hollow body past the head, said stem being longitudinally split to provide at least two resilient bifurcations thereof and said bifucations being divergent in the direction from said head toward the free end of the stem so that said bifurcations are increasingly urged together as said head approaches said valve seat to bear internally against said wall means in increasing fashion as the head approaches the valve seat without destroying the free sliding relation of said stem in the support in any position of the head relative to he valve seat.

2. A flow-controlling valve construction as defined in claim 1 wherein said stem is of non-circular cross-section so that the bifurcations thereof seat in circumferentially spaced, localized fashion in said bore.

3. A flow-controlling valve construction as defined in claim 2 wherein said bifurcations gradually diverge adjacent said head and thereafter abruptly diverge.

4. A flow-controlling valve construction as defined in claim 3 wherein each bifurcation is of generally trapezoidal cross-section.

* * * * *